July 1, 1969 — D. H. JUDGE — 3,452,455

MATHEMATICS INSTRUCTION DEVICE

Filed March 6, 1967

INVENTOR.
Dallas H. Judge
BY
ATTORNEY

United States Patent Office 3,452,455
Patented July 1, 1969

3,452,455
MATHEMATICS INSTRUCTION DEVICE
Dallas H. Judge, Box 71, East Des Moines Station,
Des Moines, Iowa 50309
Filed Mar. 6, 1967, Ser. No. 620,729
Int. Cl. G09b 23/02
U.S. Cl. 35—31                                    5 Claims

ABSTRACT OF THE DISCLOSURE

A board for mathematical instruction including a stationary board and a movable panel. The panel has an extending part on which can be written certain numerals to be moved adjacent to other numerals on the stationary part for ease in teaching the computation, particularly of division.

---

A mathematics instruction device having a framework enclosing a blackboard surface, and a slidable blackboard panel movable with respect to the surface, and including squares marked on both surfaces for marking numbers thereon, for mathematical instruction.

The following is a specification.

My invention relates to a mathematics instruction device.

One of the important objects of my device is to provide an arrangement wherein a large mathematical problem involving a dividend and a divisor, for instance, can be broken down into one part at a time, or into consecutive steps to enable the student to learn the functions of mathematics.

A further object of my invention is to provide a device which will stimulate a child's interest due to the mechanical arrangement thereof.

Further objects of my invention are to teach the use of the basic system of 10, to provide a larger board surface, and to provide means wherein the student will perform the mathematical operations in a more orderly manner.

With these and other objects in view, my invention consists in the construction, arrangement, and combination of the various parts of my device, whereby the objects contemplated are attained as hereinafter more fully set forth, pointed out in my claims, and illustrated in the accompanying drawings, in which:

Figure 1:
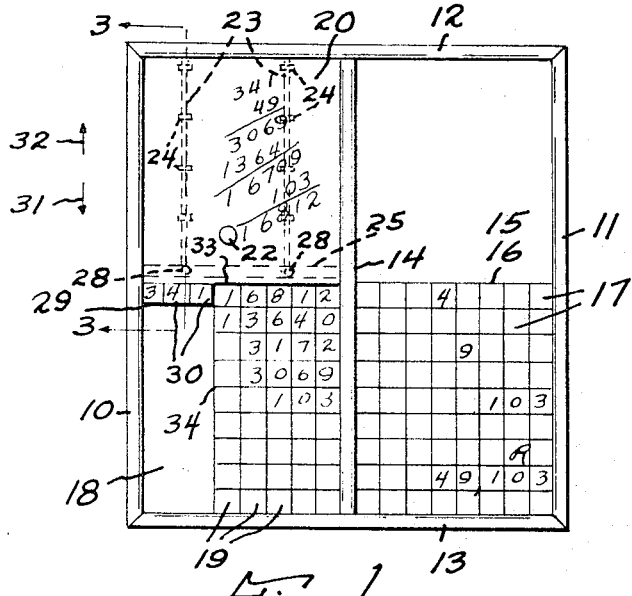
FIGURE 1 is a forward elevation of my device.

In describing my invention I have used the characters 10 and 11 to designate side strips, which together with the top strip 12 and the lower strip 13, will provide a framework, the character 14 indicating an intermediate strip, these various strips being made of any desired material.

The character 15 indicates a blackboard which can be black of green or any other color, and which has a suitable surface for the use of chalk. The board 15 includes a certain area 16 which is marked into the various squares 17.

The board 15 is secured in fixed relation between the strips 11, 12, 13 and 14, and the character 18 indicates a further fixed board having the further squares 19 marked thereon, this board being stationary and being secured between the strips 10, 12, 13, and 14.

The character 20 indicates a further board or panel which includes a similar blackboard surface, and which panel 20, however, is slidable within the grooves 21 located in the strips 10 and 14, and attached to the slidable board 20 is the handle 22 for manipulating the same.

Figure 3:
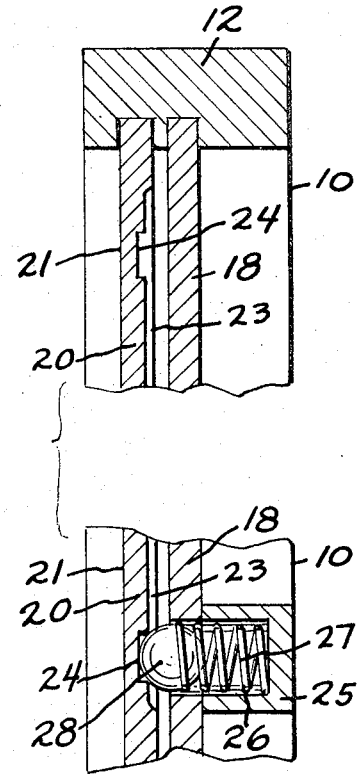
FIGURE 3 is an enlarged sectional view taken along the lines 3—3 of FIGURE 1.

Formed in the panel 20 and on the inner side thereof are the vertical grooves 23, and formed at right angles to the grooves 23 are the short recessed grooves 24 which are cut deeper into the panel or board 20 (see FIGURE 3) than the grooves 23, and which are provided at spaced vertical intervals.

Attached to the strips 10 and 14 and at the rear of the device is the transverse strip 25 having a pair of openings 26 therein, which openings receive the coiled helical springs 27 which bear against the balls 28.

The character 29 indicates an integral extending portion of the slidable panel 20 which includes the squares 30 marked thereon.

The device is used in the following manner.

In teaching a problem in long division, the divisor "341" is marked on the extending portion 29 as shown, and the dividend "16,812" is marked on the squares 19 as shown, and to the right of the divisor. Meanwhile, the panel has been held in its upper position by means of the spring pressure exerted against the balls 28 in the lower depressions 24, it being noted from FIGURE 3 that the balls will snap into these transverse depressions and hold the panel, and when the panel is moved, the balls will pass along the grooves 23.

Figure 2:
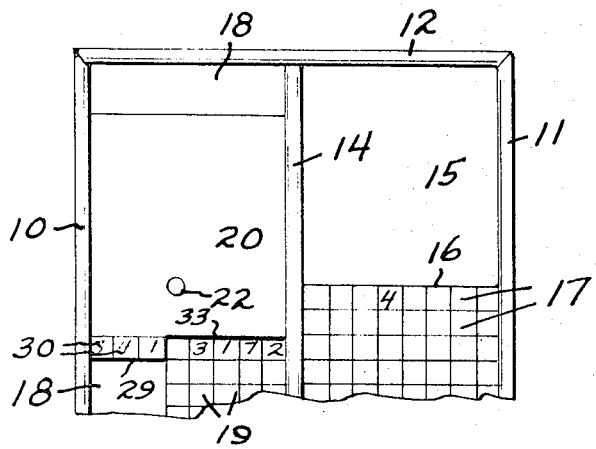
FIGURE 2 is a similar forward elevation showing the first step in a division problem.

The student next determines the first number in the quotient, which in this case will be "4," and which is marked in one of the squares 17 as shown, and the number "4" is multiplied by the divisor "341" and the number "13,640" is then placed in the squares 19 just beneath the dividend, and as shown. This number is then subtracted from the dividend giving a resulting difference of "3172" which is placed on the next lower line. Next, the student pulls the panel 20 downwardly in the direction of the arrow 31 to the position shown in FIGURE 2, and the student will estimate the next number, which will be "9" and which will be placed in the next column to the right in a space 17, and the divisor is multiplied by 9, obtaining the number "3,069" as shown. This will then provide the quotient of "49" which is carried downwardy to the lower spaces 17 as shown, the number "103" being the remainder, which is also carried down.

In order to check the accuracy of the result, the multiplication can be performed on the panel 20 when in its lowest position, this result showing "16,709" plus a remainder of "103," giving the dividend total of "16,812." The panel is then raised upwardly in the direction of the arrow 32 to its upper position as shown in FIGURE 1. As a result, the student will perform the operation with the various steps being successively broken down until the final result is obtained, and in an interesting manner.

The transverse grooves 24 are spaced vertically at equal intervals corresponding to the distance the panel will be pulled downwardly during each operation, or through a range of two spaces.

It will be further noted that after the number "3,069" is marked, the lower edge 33 of the panel will be positioned at the point 34, showing the remainder "103," and it will be noted further that the figures carried to the right to any of the spaces 17 will be at a horizontal alignment therewith.

It will be noted that the device can be used for other somewhat similar purposes as well, and the advantages thereof will be apparent.

Some changes may be made in the construction and arrangement of the parts of my invention without departing from the real spirit and purpose of my invention, and it is my intention to cover by my claims any modified forms of structure or use of mechanical equivalents which may be reasonably included within their scope.

I claim as my invention:

1. A mathematics instruction device comprising a stationary blackboard, a movable panel blackboard adapted to slide over a portion of said stationary blackboard, said portion thereby defining a partially covered portion, indicia on said portion of said stationary blackboard including substantially horizontal lines dividing the surface of said stationary blackboard into rows, said movable panel being formed with an extended portion on one side thereof adapted to extend across one more of said rows than the main body of said panel.

2. The device of claim 1 in which said stationary blackboard also includes an uncovered portion, laterally adjacent to said partially covered portion, said uncovered portion also carrying indicia dividing the surface into rows and columns for marking numbers thereon.

3. The structure of claim 1 and including resilient means positioned between said movable panel and said stationary blackboard for securing said movable panel in selected positions.

4. The structure of claim 3, and wherein said resilient means includes lengthened vertical grooves in said movable panel, a support, spring-urged balls received in said support, and in said grooves, said grooves having indented cavities therein for receiving said balls at pre-selected positions.

5. The structure of claim 4 and including a framework to which said stationary blackboard is attached, said framework including an intermediate vertical strip, said strip and said framework having grooves receiving the side edges of said movable panel.

References Cited

UNITED STATES PATENTS 412,194  10/1889  Marks _____ 35—63

FOREIGN PATENTS 23,071  1913  Great Britain.

LAWRENCE CHARLES, *Primary Examiner.*